(12) United States Patent
Osterfeld et al.

(10) Patent No.: US 9,630,586 B2
(45) Date of Patent: Apr. 25, 2017

(54) AIRBAG COVER

(71) Applicant: TK HOLDINGS INC., Auburn Hills, MI (US)

(72) Inventors: Douglas Lee Osterfeld, Waterford, MI (US); Leonid Golod, Troy, MI (US); Tyrone R. Secord, Rochester Hills, MI (US)

(73) Assignee: TK Holdings Inc., Auburn Hills, MI (US)

( * ) Notice: Subject to any disclaimer, the term of this patent is extended or adjusted under 35 U.S.C. 154(b) by 41 days.

(21) Appl. No.: 14/259,680

(22) Filed: Apr. 23, 2014

(65) Prior Publication Data

US 2014/0319806 A1 Oct. 30, 2014

Related U.S. Application Data

(60) Provisional application No. 61/815,466, filed on Apr. 24, 2013.

(51) Int. Cl.
| | | |
|---|---|---|
| *B60R 21/215* | (2011.01) | |
| *B60R 21/217* | (2011.01) | |
| *B60R 21/205* | (2011.01) | |
| *B60R 21/21* | (2011.01) | |

(52) U.S. Cl.
CPC .......... *B60R 21/215* (2013.01); *B60R 21/217* (2013.01); *B60R 21/205* (2013.01); *B60R 21/21* (2013.01)

(58) Field of Classification Search
CPC ..... B60R 21/215; B60R 21/205; B60R 21/21; B60R 21/217; Y10T 403/60; Y10T 403/606; Y10T 403/64; Y10T 403/648; Y10T 403/7037; B65D 45/22; B65D 45/20; B65D 45/18; B65D 45/16; B65D 43/164; B65D 43/163; B65D 43/16; B65D 43/22
USPC .... 280/728.2, 728.3; 292/80, 81, 87, 89, 91, 292/107, 300, 303, DIG. 11, DIG. 38; 220/841, 326, 324, 315
See application file for complete search history.

(56) References Cited

U.S. PATENT DOCUMENTS

| | | | | |
|---|---|---|---|---|
| 1,439,510 | A * | 12/1922 | Foster, Jr. ............ | A44C 5/2085 292/303 |
| 4,109,950 | A * | 8/1978 | Amdal .................. | E05B 63/248 292/254 |
| 5,303,951 | A | 4/1994 | Goestenkors et al. | |
| 5,454,586 | A * | 10/1995 | Rogerson ................. | 280/728.2 |
| 5,470,097 | A * | 11/1995 | Elqadah et al. .......... | 280/728.3 |
| 5,524,922 | A * | 6/1996 | Soderquist ............... | 280/728.3 |
| 5,647,608 | A * | 7/1997 | Damman et al. .......... | 280/728.2 |
| 5,676,393 | A | 10/1997 | Rose | |

(Continued)

FOREIGN PATENT DOCUMENTS

KR  20-0387309 Y1  6/2005

OTHER PUBLICATIONS

International Search Report and Written Opinion dated Aug. 13, 2014 issued in connection with International Application No. PCT/US2014/035112.

*Primary Examiner* — Paul N Dickson
*Assistant Examiner* — Joselynn Y Sliteris
(74) *Attorney, Agent, or Firm* — Gordon & Rees LLP

(57) ABSTRACT

An airbag module is provided. The airbag module may include an inflator, an inflatable airbag, a housing and a cover. The cover may include a retainer hook and a snap-lock configured to engage the housing.

20 Claims, 4 Drawing Sheets

(56) References Cited

U.S. PATENT DOCUMENTS

| | | | | |
|---|---|---|---|---|
| 5,823,566 | A * | 10/1998 | Manire | B60R 21/2171 |
| | | | | 280/728.3 |
| 6,439,598 | B1 * | 8/2002 | Braun | B60R 21/213 |
| | | | | 280/728.2 |
| 6,688,640 | B1 * | 2/2004 | Davis, Jr. | B60R 21/205 |
| | | | | 280/728.3 |
| 7,000,792 | B2 * | 2/2006 | Arai | B65D 43/22 |
| | | | | 215/237 |
| 7,144,034 | B2 * | 12/2006 | Nash et al. | 280/728.2 |
| 7,261,314 | B2 * | 8/2007 | Schneider | B60R 21/217 |
| | | | | 280/728.3 |
| 7,306,257 | B2 * | 12/2007 | Yoshikawa et al. | 280/728.2 |
| 7,441,797 | B2 * | 10/2008 | Tracht | B60R 21/207 |
| | | | | 280/730.2 |
| 8,217,266 | B2 * | 7/2012 | Caveney | H02G 3/0418 |
| | | | | 174/70 C |
| 8,360,464 | B2 * | 1/2013 | Enders | 280/730.1 |
| 8,500,155 | B2 * | 8/2013 | Enders | B60R 21/205 |
| | | | | 280/728.2 |
| 8,585,078 | B1 * | 11/2013 | Witt et al. | 280/728.3 |
| 2002/0109337 | A1 * | 8/2002 | Kassman et al. | 280/728.2 |
| 2004/0145164 | A1 | 7/2004 | North | |
| 2004/0239081 | A1 | 12/2004 | Tredez | |
| 2008/0082236 | A1 * | 4/2008 | Asaoka | 701/45 |
| 2011/0148077 | A1 * | 6/2011 | Enders | B60R 21/205 |
| | | | | 280/728.2 |

* cited by examiner

AIRBAG COVER

CROSS-REFERENCE TO RELATED PATENT APPLICATIONS

This application claims the benefit of and priority to U.S. Provisional Patent Application No. 61/815,466 filed on Apr. 24, 2013, the disclosure of which is incorporated herein by reference in its entirety.

BACKGROUND

The present application relates generally to the field of vehicle airbags. More specifically, the present invention relates to an airbag module with simplified construction and improved performance.

Vehicle airbags are used to protect vehicle occupants from injury in the event of a vehicle crash. Airbags are generally concealed and deployed from behind vehicle trim members. Typically, the airbag is contained in a module that includes a cover. As the airbag inflates, it applies a pressure to the cover, causing the cover to open and/or separate from a housing surrounding the airbag. Pre-existing airbag covers employ complex attachment mechanisms to attach the airbag cover to the housing, such as individual hooks or clips that engage corresponding features (e.g., windows, slots, hollows, etc.) in the housing. These relatively complex mechanisms increase the cost of the airbag cover.

SUMMARY

An airbag module is provided that includes an airbag housing with an open end, an airbag cushion contained in a folded state within the housing, an inflator, and a cover coupled to the open end of the housing. The cover may include a retainer hook that receives an edge of the housing and a snap-lock feature that engages the housing. A pressure applied to an interior surface of the cover via the inflation of the airbag cushion with pressurized gas produced by the inflator may dislodge the cover from the housing and allow the cushion to expand out of the housing. The retainer hook and the snap-lock feature may have a constant cross-section along their respective lengths such that they may be formed by an extrusion process.

An airbag module is provided. The airbag module may include an inflator, an inflatable airbag, a housing and a cover. The cover may include a first coupling portion and a second coupling portion, each configured to couple the cover to the housing. The first coupling portion may include a retainer hook and a snap-lock which are configured to engage at least one of a lip and an edge of the housing.

An airbag module is provided. The airbag module may include an inflator, an inflatable airbag, a housing, and a cover. The inflator may include a securing element. The cover may include a first coupling portion and a second coupling portion, each configured to couple the cover to the housing. The second coupling portion may include at least one aperture configured to receive the securing element, wherein the securing element is configured to couple the cover and inflator to the housing.

A method of producing a cover including a first coupling portion and a second coupling portion, each configured to couple the cover to a housing is provided. The first coupling portion may include a retainer hook and a snap-lock which are configured to engage at least one of a lip and an edge of the housing. The method may include extruding the cover.

It is to be understood that both the foregoing general description and the following detailed descriptions are exemplary and explanatory only, and not restrictive of the inventions.

BRIEF DESCRIPTION OF THE DRAWINGS

These and other features, aspects and advantages of the present invention will become apparent from the following description and the accompanying exemplary embodiments shown in the drawings, which are briefly described below.

DETAILED DESCRIPTION

Figure 1:
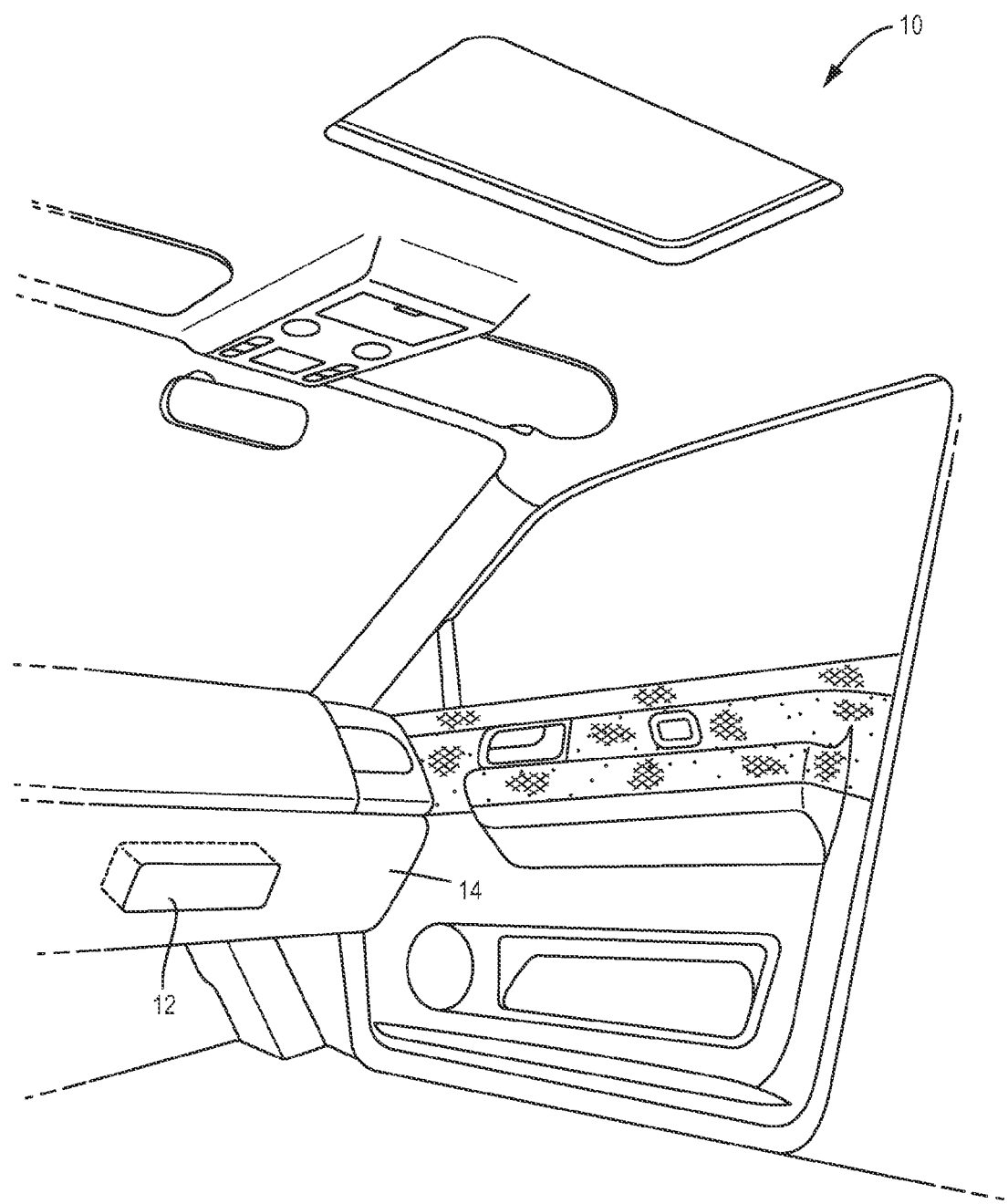
FIG. 1 is a perspective view of a vehicle interior including an airbag module.

An airbag module is provided in vehicles for the protection of occupants in the event of a vehicle crash. The airbag module may include an inflatable cushion, interchangeably referred to as an airbag cushion or cushion, and an inflator. The airbag may be configured to rapidly inflate in a space between the vehicle occupant and the vehicle dash, pillar, or other structure.

The airbag cushion may be formed from at least two panels of a suitable material, such as nylon. The panels may be coupled together with a sewn or woven seam to form at least one inflatable chamber. The airbag cushion may be divided into two or more chambers. Passages or ports may be provided between individual chambers of the airbag cushion such that the chambers of the airbag cushion are in fluid communication with each other. The cushion may be folded and concealed under a cover, trim panel or other covering in a storage position. The inflator, such as a conventional pyrotechnic inflator, supplies gas for inflation/deployment of the airbag cushion. During a vehicle impact or rollover event, the inflator may be activated to supply pressurized gas to inflate the cushion. The inflation gas may enter the cushion and drive the airbag cushion away from the storage position and into the deployed position. In the deployed position, the cushion may be disposed between the occupant and a structural member of the vehicle, such as the vehicle dash.

The airbag module may be located in variety of positions within a vehicle. For example, the airbag module may be a knee airbag module configured to inflate in the space between the knees and legs of a passenger of the vehicle and the dash. The airbag module may be mid mounted (e.g., mounted in a portion of the dash facing a passenger of the vehicle), top or high-mounted (e.g., mounted in a top portion of the dash, typically facing upward toward the windshield) or bottom mounted (e.g., mounted in a bottom portion of the dash, typically facing toward the floor). The airbag module may be a front passenger side airbag module mounted in the dash in front of a passenger of the vehicle or may be a configured to inflate in the space between the body of a passenger of the vehicle and the instrument panel.

While the airbag module is described below as a dash-mounted airbag, it should be understood by those skilled in the art that the inventive concepts may be applied to any suitable airbag and such airbags may be located in a variety of locations within the vehicle (e.g., a side curtain airbag, a seat-mounted side impact airbag, etc.).

As the airbag cushion inflates, the airbag cushion may apply a pressure to the back side of the cover, causing the cover to separate from the module housing and creating an opening in the trim panel through which the airbag cushion may expand. The cover may be formed by an extrusion process. The extrusion process may be a relatively inexpensive extrusion process. The cover may include an integrally formed snap-lock feature. The snap-lock feature may couple the cover to the module housing and facilitate the separation of the cover from the housing as the airbag cushion is inflated. By providing a coupling and opening feature in the form of an extruded snap-lock feature, the cost of the cover may be reduced in comparison to traditional covers that include molded hook or clip features. The cover including an extruded snap-lock feature may be used without the need for secondary attachments or tear seams.

Referring now to FIG. 1, a vehicle interior 10 (e.g., occupant compartment, etc.) is shown. An airbag module 12 may be provided in the vehicle interior 10, and is shown in FIG. 1 as a passenger side knee airbag module. Alternatively, the airbag module 12 may be a driver's side front airbag, a passenger's side front airbag, a side airbag, a curtain airbag, etc. The airbag module 12 may be used in a plurality of vehicles, including cars, trucks, vans, SUVs, crossover vehicles, buses, RVs, etc. The airbag module 12 may be concealed behind a trim member, which may be snapped, screwed, or otherwise secured in place over the airbag module 12. The airbag module 12 may deploy through an opening in a trim member into a space between an occupant of the vehicle and the dash 14. The airbag module 12 may be bottom-mounted on the dash 14, as shown in FIG. 1, may be top-mounted on the dash 14, may be mid-mounted on the dash 14, or the airbag module 12 may be mounted in any other suitable location in the vehicle.

Figure 2:
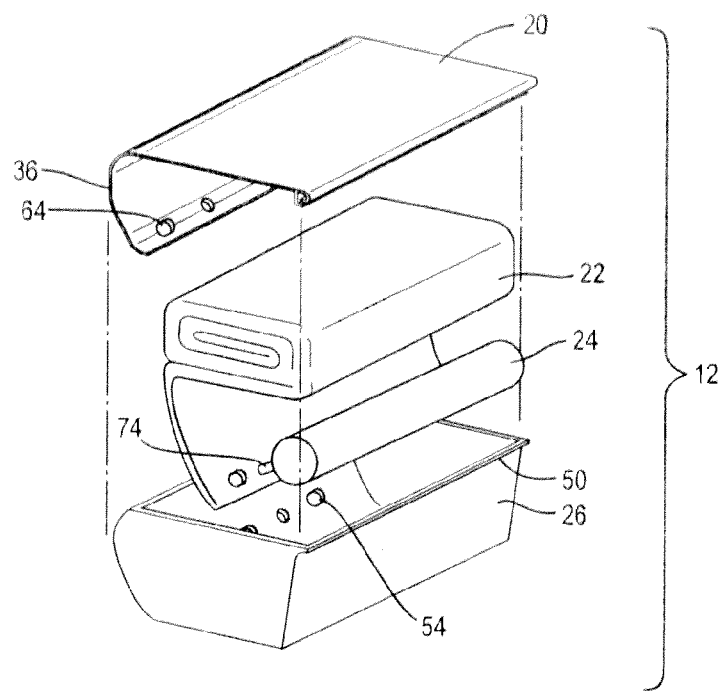
FIG. 2 is a schematic exploded view of an airbag module.

Referring to FIG. 2, an exploded schematic view of the airbag module 12 is shown. The airbag module 12 may include an airbag cushion 22 configured to be inflated by an inflator or gas generator 24, shown schematically in FIG. 2. The inflator 24 may be a pyrotechnic gas generator. Alternatively, the inflator 24 may be a compressed gas generator or a combination pyrotechnic and compressed gas generator. The inflator 24 may include at least one securing element 74 configured to couple the inflator 24 and the cover 20 to the housing 26. The securing element 74 may be a stud that extends from the inflator body, and may include a threaded portion configured to engage a nut 76. The airbag cushion 22 may be secured in a folded state in a housing 26. The housing 26 may be secured to a frame member in the dash 14. The cover 20 may be coupled to the open end of the housing 26 to enclose the folded airbag cushion 22 within the housing 26. The housing 26 may include a housing aperture 54 configured to receive the securing element 74.

The airbag cushion 22 may be formed from a first panel (e.g., inboard panel, inner panel, front panel, etc.) and a second panel (e.g., outboard panel, outer panel, rear panel, etc.). The first and second panels may be coupled together by a plurality of sewn seams. The first panel and the second panel may be formed from a nylon fabric. The panels may be secured together by other suitable methods, such as thermobonding or welding. The panels and the connecting seams may be coated with a sealant in order to reduce the leakage of inflation gas. The airbag cushion 22 may be divided into two or more compartments or chambers. Passages or ports may be provided between individual chambers of the airbag cushion such that the chambers are in fluid communication with each other. The airbag cushion 22 may also include a plurality of un-inflated portions, such as un-inflated portions configured to separate the chambers. The airbag cushion 22 may include at least one aperture configured to receive securing element 74, coupling the airbag cushion 22 to the housing 26.

During a side impact, roll over, frontal impact or frontal offset impact event involving the vehicle, sensors may trigger the inflator 24 to rapidly generate and force gas into the airbag cushion 22. The airbag cushion 22 may deploy away from a storage position and toward a vehicle occupant to a deployed position. The airbag cushion 22 may expand in the vehicle aft direction as gas is forced into the cushion 22 by the inflator 24. In the deployed position, the airbag cushion 22 may be disposed between a vehicle occupant and the dash 14.

Figure 3:
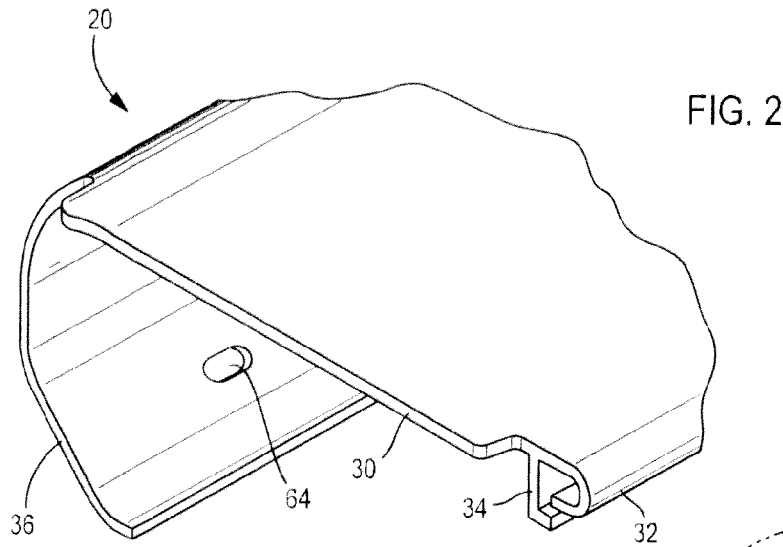
FIG. 3 is a schematic perspective view of an extruded cover for an airbag module.
Figure 5:
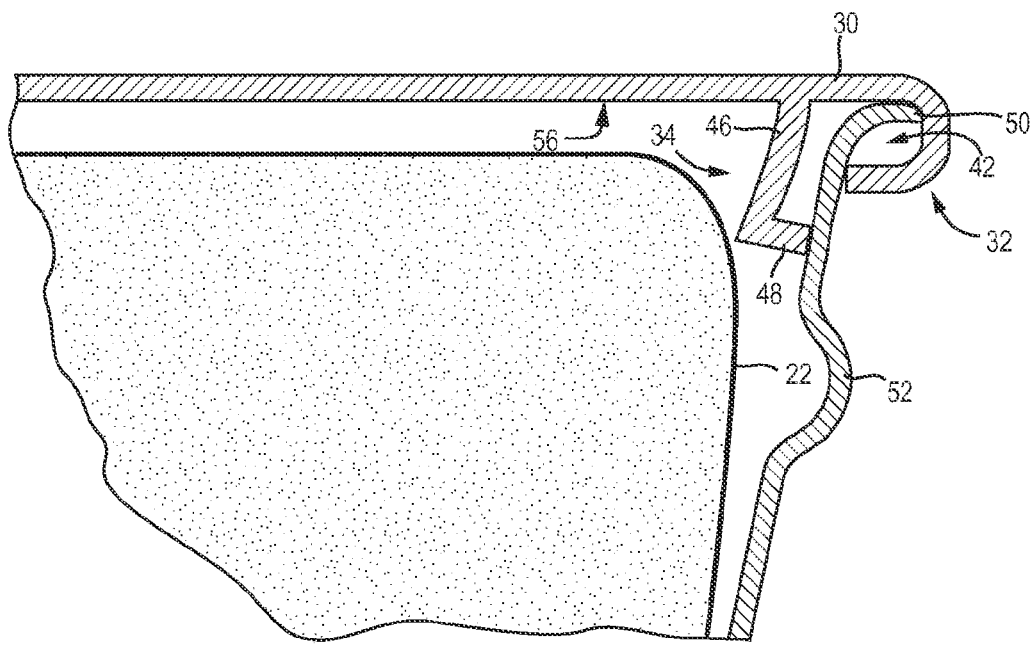
FIG. 5 is schematic a cross-section view of the cover of FIG. 3 coupled to an airbag module housing.

Referring now to FIG. 3, the cover 20 is shown in more detail. The cover 20 may include a top panel 30 that covers an open end of the housing 26. A retainer hook 32 may extend from an edge of the top panel 30. A snap-lock feature 34 may extend from an inner surface of the top panel 30, proximate to the retainer hook 32. The retainer hook 32 and the snap-lock feature 34 may form a first coupling portion of the cover 20 and cooperate to engage an edge or lip 50 of the housing, as shown in FIG. 5. The retainer hook 32 and the snap-lock feature 34 may be configured to have a constant cross-section such that the cover 20 may be formed with a relatively inexpensive extrusion process. The cover 20 may include a second coupling portion 36 configured to couple the cover to the housing 26. The second coupling portion 36 may include at least one cover aperture 64 configured to receive the securing element 74. The cover aperture 64 may be aligned with the housing aperture 54. As shown in FIG. 3, the first coupling portion may be located on an edge of the cover 20 opposite to the second coupling portion 36 of the cover. Alternatively, the first coupling portion may be located on an edge of the cover 20 adjacent to the second coupling portion, and the cover 20 may include a plurality of first coupling portions arranged on a single edge of the cover 20 or on multiple edges of the cover. The cover 20 may include two first coupling portions located on edges adjacent to the second coupling portion 36 and opposite each other, and an uncoupled edge opposite the second coupling portion. The cover 20 may have a circular geometry, with the first coupling portion extending along a first portion of the circumferential edge and the second coupling portion extending along a second portion of the circumferential edge, such as a first coupling portion extending along 350° and the second coupling portion extending along 10° of the circumferential edge of the cover.

Figure 4:
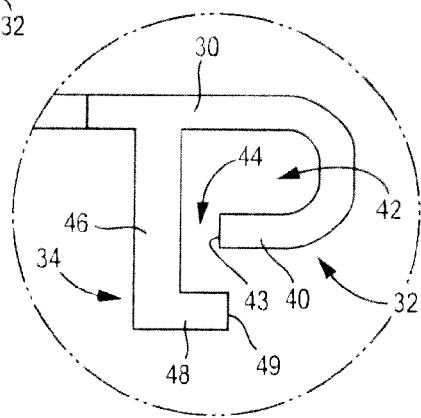
FIG. 4 is a detail side elevation view of the cover of FIG. 3.

Referring now to FIG. 4, the first coupling portion of the cover is shown in more detail. The first coupling portion of the cover may include the retainer hook 32 and the snap-lock feature 34. The retainer hook 32 may be a C-shaped body extending from the edge of the top panel 30. The retainer hook 32 may include a lower portion 40 that is spaced apart from and generally parallel to the top panel 30. The retainer hook 32 may define an interior cavity 42. The snap-lock feature 34 may be located inboard from the retainer hook 32. The snap-lock feature 34 may be an L-shaped body with an upper portion 46 that extends downward from the top panel 30 and a lower portion 48 that extends outwardly from the end of the upper portion 46. The upper portion 46 may be separated from the retainer hook 32 by a gap 44. The distal end 43 of the retainer hook 32 may be separated from the distal end 49 of the snap-lock feature 34 by a distance less than the width of the gap 44, such that the lower portion 48 of the snap-lock feature 34 obstructs the gap 44. The distal end 43 of the retainer hook 32 may be located inboard from the distal end 49 of the snap-lock feature 34.

Referring now to FIG. 5, the first coupling portion of the cover 20 is shown coupled to the housing 26. A lip 50 of a sidewall 52 of the housing 26 may be inserted into the cavity 42 through the gap 44 between the retainer hook 32 and the snap-lock feature 34. Because the lower portion 48 of the snap-lock feature 34 obstructs the path through the gap 44, the sidewall 52 may deflect the snap-lock feature 34 as the lip 50 is inserted through the gap 44. With the lip 50 inserted into the cavity 42, the lower portion 48 of the snap-lock feature 34 may be displaced, thereby coupling the cover 20 to the housing 26. The displacement of the snap-lock feature 34 may prevent the inadvertent or unintentional separation of the first coupling portion of the cover from the housing 26 by maintaining the engagement of the retainer hook 32 with the lip 50 of the housing sidewall 52. The displacement of the snap-lock feature 34 may limit travel of the first coupling portion of the cover in a direction extending transversely to the housing sidewall 52.

Figure 6:
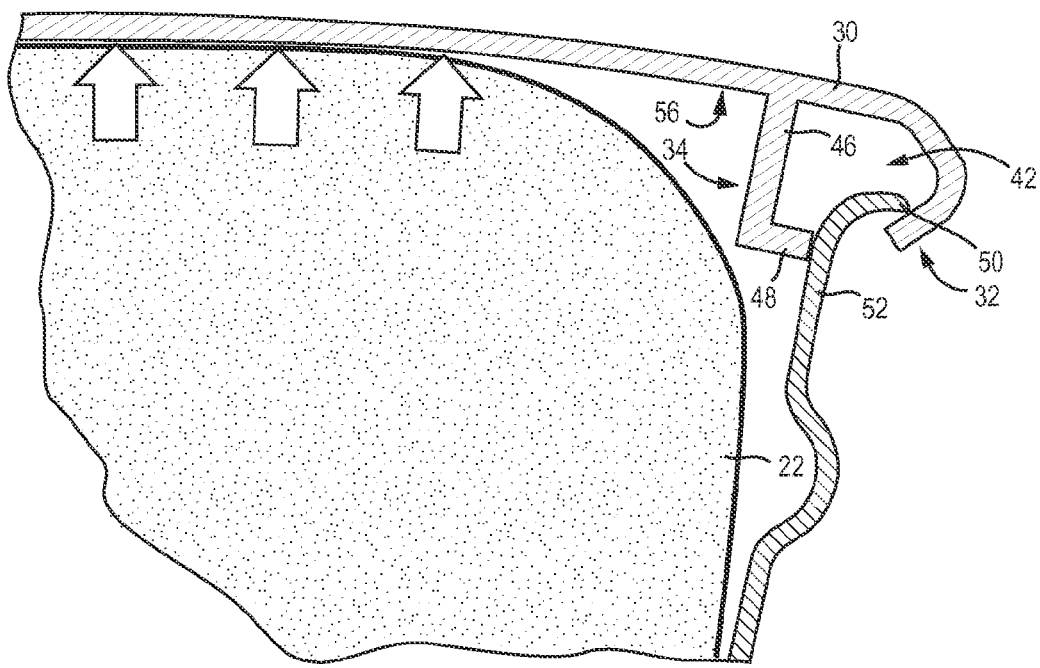
FIG. 6 is a schematic cross-section view of the cover of FIG. 3 coupled to an airbag module housing with the cover disengaged from the housing by an inflating airbag cushion.

Referring now to FIG. 6, inflation of the airbag cushion 22 with pressurized gas produced by the inflator 24 may cause the airbag cushion to expand within the housing 26 and apply a pressure on the inner surface 56 of the cover 20. The pressure may push the cover 20 upward. The pressure on the cover 20 may cause the retainer hook 32 to open, releasing the lip 50 from the cavity 42. As shown in FIG. 6, a portion of the retainer hook 32 may distort to allow the retainer hook 32 to open relative to the top panel 30. The cover 20 may then be pushed out of the path of the inflating airbag cushion 22, allowing the airbag cushion 22 to inflate further away from the housing 26 and into the space between an occupant of the vehicle and the dash 14.

Figure 7:
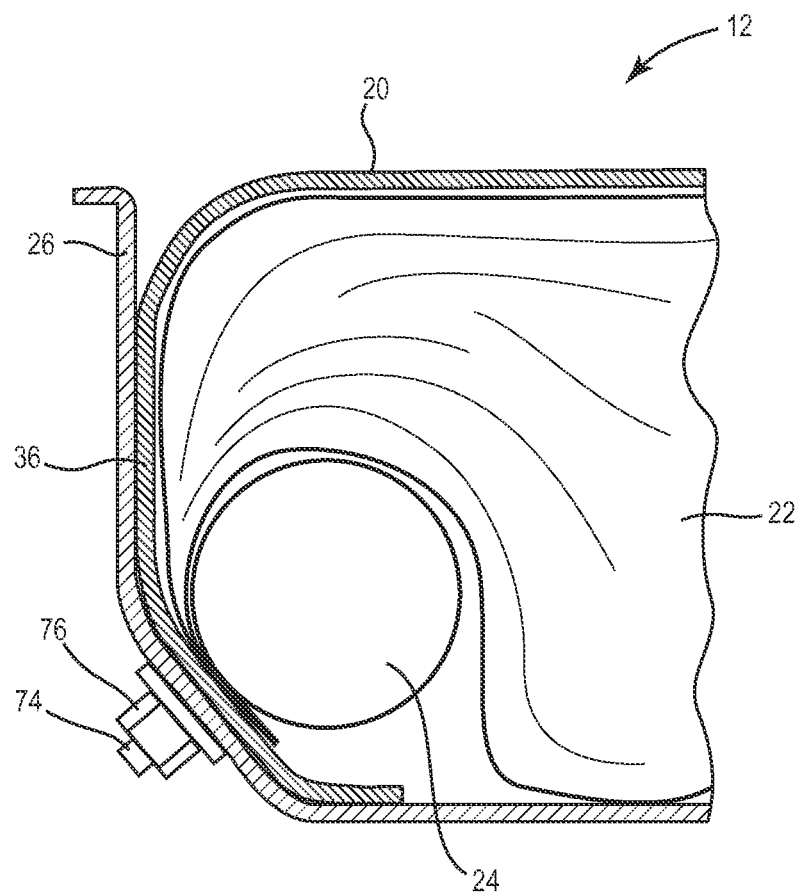
FIG. 7 is a schematic cross-section view of an airbag module.

Referring now to FIG. 7, a cross-section of the assembled air-bag module is depicted. The securing element 74 of the inflator 24 may extend through the airbag cushion 22, the second coupling portion 36 of the cover 20 and the housing 26 and engages the nut 76, coupling each the cover to the housing. The second coupling portion 36 may be located within the housing 26, and between the housing 26 and the airbag cushion 22. The securing element 74 may extend through apertures in the airbag cushion 22, the second coupling portion 36 and the housing 26. As shown in FIG. 7, the second coupling portion 36 may have a shape matching the interior geometry of the portion of the housing 26 which it contacts. The second coupling portion 36 may remain coupled to the housing during and after inflation of the airbag cushion 22.

It is important to note that the construction and arrangement of the airbag cover shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:
1. An airbag module comprising:
an inflator,
an inflatable airbag,
a housing storing the inflator and the inflatable airbag, and
a cover, the cover overlying the housing such that the cover comprises a first coupling portion and a second coupling portion configured to couple the cover to the housing, wherein
the first coupling portion comprises a C-shaped retainer hook and a snap-lock which are configured to couple the cover to the housing by engaging at least one of a lip and an edge of the housing, and
the retainer hook is configured to open and release the first coupling portion from the housing upon inflation of the inflatable airbag.
2. The airbag module of claim 1, wherein the retainer hook comprises a portion that extends in a direction parallel to a top panel of the cover.
3. The airbag module of claim 1, wherein the snap-lock comprises an L-shaped portion.
4. The airbag module of claim 3, wherein the snap-lock comprises:
an upper portion, and
a lower portion,
wherein the upper portion extends from a top panel of the cover and the lower portion extends from a distal end of the upper portion.
5. The airbag module of claim 1, wherein the retainer hook and snap-lock have a constant cross-section.
6. The airbag module of claim 1, wherein an upper portion of the snap-lock and a distal end of the retainer hook are separated by a gap, and a lower portion of the snap-lock at least partially obstructs the gap.
7. The airbag module of claim 6, wherein the snap-lock is configured to be displaced when the retainer hook and snap-lock engage the at least one of the lip and the edge of the housing.
8. The airbag module of claim 1, wherein the second coupling portion is configured to remain coupled to the housing upon inflation of the inflatable airbag.
9. An airbag module comprising:
an inflator,
an inflatable airbag,
a housing storing the inflator and the inflatable airbag, and
a cover, the cover overlying the housing such that the cover comprises a first coupling portion and a second coupling portion configured to couple the cover to the housing, wherein
the first coupling portion comprises a retainer hook and an L-shaped snap-lock which are configured to couple the cover to the housing by engaging at least one of a lip and an edge of the housing, and
the retainer hook is configured to open and release the first coupling portion from the housing upon inflation of the inflatable airbag.

10. The airbag module of claim 9, wherein the retainer hook comprises a portion that extends in a direction parallel to a top panel of the cover.

11. The airbag module of claim 9, wherein the retainer hook comprises a C-shaped portion.

12. The airbag module of claim 9, wherein the snap-lock comprises:
   an upper portion, and
   a lower portion,
   wherein the upper portion extends from a top panel of the cover and the lower portion extends from a distal end of the upper portion.

13. The airbag module of claim 9, wherein the retainer hook and snap-lock have a constant cross-section.

14. The airbag module of claim 9, wherein an upper portion of the snap-lock and a distal end of the retainer hook are separated by a gap, and a lower portion of the snap-lock at least partially obstructs the gap.

15. The airbag module of claim 14, wherein the snap-lock is configured to be displaced when the retainer hook and snap-lock engage the at least one of the lip and the edge of the housing.

16. The airbag module of claim 9, wherein the second coupling portion is configured to remain coupled to the housing upon inflation of the inflatable airbag.

17. An airbag module comprising:
   an inflator,
   an inflatable airbag,
   a housing storing the inflator and the inflatable airbag, and
   a cover, the cover overlying the housing such that the cover comprises a first coupling portion and a second coupling portion configured to couple the cover to the housing, wherein
   the first coupling portion comprises a retainer hook and a snap-lock which are configured to couple the cover to the housing by engaging at least one of a lip and an edge of the housing,
   the retainer hook and snap-lock have a constant cross-section, and
   the retainer hook is configured to open and release the first coupling portion from the housing upon inflation of the inflatable airbag.

18. The airbag module of claim 17, wherein an upper portion of the snap-lock and a distal end of the retainer hook are separated by a gap, and a lower portion of the snap-lock at least partially obstructs the gap.

19. The airbag module of claim 18, wherein the snap-lock is configured to be displaced when the retainer hook and snap-lock engage the at least one of the lip and the edge of the housing.

20. The airbag module of claim 17, wherein the second coupling portion is configured to remain coupled to the housing upon inflation of the inflatable airbag.

* * * * *